(12) United States Patent
Yoshino et al.

(10) Patent No.: US 8,731,057 B2
(45) Date of Patent: May 20, 2014

(54) VIDEO ENCODING APPARATUS, VIDEO DECODING APPARATUS, VIDEO ENCODING METHOD, VIDEO DECODING METHOD, AND COMPUTER PROGRAM

(75) Inventors: Tomonobu Yoshino, Saitama-ken (JP); Sei Naitou, Saitama-ken (JP); Shigeyuki Sakazawa, Saitama-ken (JP)

(73) Assignee: KDDI Corporation, Tokyo (JP)

( * ) Notice: Subject to any disclaimer, the term of this patent is extended or adjusted under 35 U.S.C. 154(b) by 360 days.

(21) Appl. No.: 13/209,875

(22) Filed: Aug. 15, 2011

(65) Prior Publication Data

US 2012/0069901 A1 Mar. 22, 2012

(30) Foreign Application Priority Data

Sep. 22, 2010 (JP) ................................. 2010-212182

(51) Int. Cl.
*H04N 1/417* (2006.01)
(52) U.S. Cl.
USPC ............ 375/240.12; 375/240.13; 375/240.14; 375/240.29
(58) Field of Classification Search
USPC ............. 375/240.12, 240.13, 240.14, 240.29, 375/343, 350
See application file for complete search history.

(56) References Cited

U.S. PATENT DOCUMENTS

| 2004/0076333 | A1 | 4/2004 | Zhang et al. | |
| 2004/0161035 | A1 | 8/2004 | Wedi | |
| 2009/0257493 | A1* | 10/2009 | Ye et al. | 375/240.12 |
| 2010/0135398 | A1* | 6/2010 | Wittmann et al. | 375/240.16 |
| 2010/0220788 | A1* | 9/2010 | Wittmann et al. | 375/240.16 |
| 2012/0147959 | A1* | 6/2012 | Amano et al. | 375/240.16 |

FOREIGN PATENT DOCUMENTS

JP 2004147328 A 5/2004

OTHER PUBLICATIONS

Hideaki et al. JP 2004-165785 JPO Full Text and Abstract Translation. Jun. 2004.*
Joint Video Team (JVT) of ISO/IEC MPEG and ITU-T VCEG, "Text of ISO/IEC 14496-10 Advanced Video Coding," Jul. 2004.
Thomas Wedi, "Adaptive Interpolation Filters and High-Resolution Displacements for Video Coding," IEEE Trans. on Circuits and Systems for Video Technology, vol. 16, No. 4, Apr. 2006.
G.J. Sullivan and Thomas Wiegand, "Rate-Distortion Optimization for Video Compression," IEEE Signal Processing Magazine, pp. 74-90, Nov. 1998.

* cited by examiner

*Primary Examiner* — Christopher S Kelley
*Assistant Examiner* — Zhihan Zhou
(74) *Attorney, Agent, or Firm* — BainwoodHuang

(57) ABSTRACT

It is a purpose of the present invention to provide a video encoding apparatus, a video decoding apparatus, a video encoding method, a video decoding method, and a computer program, which allow adaptive filter coefficients to be used with a reduced amount of coding. A video encoding apparatus AA selects a suitable coefficient from among multiple kinds of interpolation filter coefficients determined beforehand by means of a component external to the video encoding apparatus AA. Subsequently, the video encoding apparatus AA records identification information uniquely defined for the selected interpolation filter coefficient in control information for each slice. Furthermore, the video encoding apparatus AA uses the interpolation filter coefficient thus selected to generate encoded data c including the identification information uniquely defined for the interpolation filter coefficient thus selected.

15 Claims, 7 Drawing Sheets

VIDEO ENCODING APPARATUS, VIDEO DECODING APPARATUS, VIDEO ENCODING METHOD, VIDEO DECODING METHOD, AND COMPUTER PROGRAM

This application is based on and claims the benefit of priority from Japanese Patent Application No. 2010-212182, filed on 22 Sep. 2010, the content of which is incorporated herein by reference.

BACKGROUND OF THE INVENTION

1. Field of the Invention

The present invention relates to a video encoding apparatus, a video decoding apparatus, a video encoding method, a video decoding method, and a computer program.

2. Description of the Related Art

Joint Video Team (JVT) of ISO/IEC MPEG and ITU-T VCEG, "Text of ISO/IEC 14496-10 Advanced Video Coding," July 2004, discloses a standard method for video compression which allows an inter-frame prediction to be performed. With such an inter-frame prediction, a region having a pattern similar to that of an encoding target region is detected from an image which has already been encoded, and the pixel values of the region thus detected are used as the predicted values of the encoding target region. In the following description, the processing for obtaining the prediction error that occurs in an inter-frame prediction will be referred to as "motion compensation". Also, a spatial vector that indicates the offset from an encoding target region to a similar region which has already been encoded will be referred to as an "MV (Motion Vector)".

With the method disclosed in Joint Video Team (JVT) of ISO/IEC MPEG and ITU-T VCEG, in a similar region detection operation (motion estimation operation), pixel values at intermediate positions (fractional position accuracy) are also generated by an interpolation operation in addition to the pixel values at integer sampling positions (integer position accuracy), and the pixel values thus generated by the interpolation operation can also be used as predicted values. The technique disclosed in Joint Video Team (JVT) of ISO/IEC MPEG and ITU-T VCEG provides an inter-frame prediction with quarter-pixel precision.

Also, a method (method using an adaptive interpolation filter) has been proposed in Thomas Wedi, "Adaptive Interpolation Filters and High-Resolution Displacements for Video Coding," IEEE Trans. on Circuits and Systems for Video Technology, Vol. 16, No. 4, April 2006, in which processing is performed on a video pattern or the like in an adaptive manner, which is to be applied to interpolation processing (processing using interpolation filter coefficients) used in an operation for performing motion estimation with fractional pixel accuracy. Such a technique described in Thomas Wedi provides improved encoding performance as compared with the technique described in the aforementioned Joint Video Team (JVT) of ISO/IEC MPEG and ITU-T VCEG.

SUMMARY OF THE INVENTION

With such a technique described in Thomas Wedi, the adaptive interpolation filter coefficients can be set for each slice. However, if the control information for each slice includes such an adaptive interpolation filter coefficient, such an arrangement generates a very large amount of information, on the order of several tens of kbps, for example. Accordingly, in a case in which the technique described in Thomas Wedi is applied to the standard method for performing video compression described in Joint Video Team (JVT) of ISO/IEC MPEG and ITU-T VCEG, "Text of ISO/IEC 14496-10 Advanced Video Coding," such an arrangement leads to an increase in the amount of information proportional to the aforementioned additional information, on the order of several tens of kbps, for example.

Accordingly, the present invention has been made in order to solve the aforementioned problem. It is a purpose of the present invention to provide a video encoding apparatus, a video decoding apparatus, a video encoding method, a video decoding method, and a program, which allow adaptive filter coefficients to be used with reduced amounts of encoding.

For the purpose of summarizing the invention, certain aspects of the invention have been described herein. It is to be expressly understood that it is not intended as a definition of the limits of the invention.

The present invention proposes the following ideas in order to solve the aforementioned problems.

An embodiment of the present invention proposes a video encoding apparatus configured to allow filtering processing to be performed for a predicted value in an inter-frame prediction. The video encoding apparatus comprises: an encoding filter coefficient holding unit (which corresponds to the fractional position interpolated value generating unit 21 shown in FIG. 2 or the fractional position interpolated value generating unit 21A shown in FIG. 7, for example) configured to hold multiple kinds of filter coefficients determined beforehand (which correspond to the multiple kinds of filter coefficients determined by means of a component external to the video encoding apparatus AA shown in FIG. 1, or multiple kinds of filter coefficients determined by means of an internal component of the video encoding apparatus CC shown in FIG. 6, for example); an encoding identification information holding unit (which corresponds to the entropy coding unit 6 shown in FIG. 1 or 6, for example) configured to hold identification information uniquely defined for each of the multiple kinds of filter coefficients (which corresponds to identification information uniquely defined for each of the multiple kinds of interpolation filter coefficients included in the third information described later, for example); an encoding filter coefficient selecting unit (which corresponds to the fractional position interpolated value generating unit 21 shown in FIG. 2 or the fractional position interpolated value generating unit 21A shown in FIG. 7, for example) configured to select, in each unit of coding control data (which correspond to one or more macroblocks, one or more slices, one or more pictures, or one or more frames, described later, for example), one from among the multiple kinds of filter coefficients held by the encoding filter coefficient holding unit; an identification information selecting unit (which corresponds to the entropy coding unit 6 shown in FIG. 1 or 6, for example) configured to select, in each unit of coding control data, identification information uniquely defined for the filter coefficient selected by the encoding filter coefficient selecting unit, from among the multiple kinds of identification information held by the encoding identification information holding unit; and an encoding data generating unit (which corresponds to the entropy coding unit 6 shown in FIG. 1 or 6, for example) configured to generate encoded data (which corresponds to the encoded data c shown in FIG. 1 or 6, for example) including the identification information selected by the identification information selecting unit.

The video encoding apparatus according to the present invention, configured to allow filtering processing to be performed for a predicted value in an inter-frame prediction, comprises an encoding filter coefficient holding unit, an encoding identification information holding unit, an encoding filter coefficient selecting unit, an identification information selecting unit, and an encoding data generating unit. With such an arrangement, the encoding filter coefficient holding unit is configured to hold multiple kinds of filter coefficients determined beforehand, and the encoding identification holding unit is configured to hold identification information uniquely defined for each of the multiple kinds of filter coefficients. Furthermore, the encoding filter coefficient selecting unit is configured to select, in each unit of coding control data, one from among the multiple kinds of filter coefficients held by the encoding filter coefficient holding unit. Moreover, the identification information selecting unit is configured to select, in each unit of coding control data, the identification information uniquely defined for the filter coefficient selected by the encoding filter coefficient selecting unit, from among the multiple kinds of identification information held by the encoding identification information holding unit. In addition, the encoding data generating unit is configured to generate encoded data including the identification information selected by the identification information selecting unit.

Accordingly, the video encoding apparatus described in the aforementioned aspect is capable of selecting adaptive filter coefficients in each unit of coding control data, and of generating encoded data including the identification information uniquely defined for the filter coefficient thus selected. Such an arrangement allows the amount of information included in the encoded data to be reduced, as compared with an arrangement configured to select such adaptive filter coefficients in each unit of coding control data, and to generate encoded data including the filter coefficient thus selected.

Another embodiment of the present invention proposes a video encoding method for allowing filtering processing to be performed for a predicted value in an inter-frame prediction, comprising: a first step (which corresponds to Step S2 shown in FIG. 3, for example) for holding multiple kinds of filter coefficients determined beforehand (which correspond to the multiple kinds of filter coefficients determined by means of a component external to the video encoding apparatus AA shown in FIG. 1, or multiple kinds of filter coefficients determined by means of an internal component of the video encoding apparatus CC shown in FIG. 6, for example); a second step (which corresponds to Step S3 shown in FIG. 3) for holding identification information (which corresponds to identification information uniquely defined for each of the multiple kinds of interpolation filter coefficients included in the third information described later, for example) uniquely defined for each of the multiple kinds of filter coefficients; a third step (which corresponds to Step S4 shown in FIG. 3, for example) for selecting, in each unit of coding control data (which correspond to one or more macroblocks, one or more slices, one or more pictures, or one or more frames, described later, for example), one from among the multiple kinds of filter coefficients held in the first step; a fourth step (which corresponds to Step S4 shown in FIG. 3, for example) for selecting, in each unit of coding control data, the identification information uniquely defined for the filter coefficient selected in the third step, from among the multiple kinds of identification information held in the second step; and a fifth step for generating encoded data (which corresponds to the encoded data c shown in FIG. 1 or 6, for example) including the identification information selected in the fourth step.

With the present invention, first, multiple kinds of filter coefficients determined beforehand are held, and identification information defined for each of the multiple kinds of filter coefficients is held. Next, one filter coefficient is selected, in each unit of coding control data, from among the multiple kinds of filter coefficients thus held, and the identification information uniquely defined for the selected filter coefficient is selected, in each unit of coding control data, from the multiple kinds of identification information thus held, so as to generate encoded data including the identification information thus selected.

Yet another embodiment of the present invention proposes a computer readable storage medium, comprising: a program encoded and stored in a computer readable format to cause a computer to execute a video encoding method for allowing filtering processing to be performed for a predicted value in an inter-frame prediction, the video encoding method comprising steps of: a first step (which corresponds to Step S2 shown in FIG. 3, for example) for holding multiple kinds of filter coefficients determined beforehand (which correspond to the multiple kinds of filter coefficients determined by means of a component external to the video encoding apparatus AA shown in FIG. 1, or multiple kinds of filter coefficients determined by means of an internal component of the video encoding apparatus CC shown in FIG. 6, for example); a second step (which corresponds to Step S3 shown in FIG. 3) for holding identification information (which corresponds to identification information uniquely defined for each of the multiple kinds of interpolation filter coefficients included in the third information described later, for example) uniquely defined for each of the multiple kinds of filter coefficients; a third step (which corresponds to Step S4 shown in FIG. 3, for example) for selecting, in each unit of coding control data (which correspond to one or more macroblocks, one or more slices, one or more pictures, or one or more frames, described later, for example), one from among the multiple kinds of filter coefficients held in the first step; a fourth step (which corresponds to Step S4 shown in FIG. 3, for example) for selecting, in each unit of coding control data, the identification information uniquely defined for the filter coefficient selected in the third step, from among the multiple kinds of identification information held in the second step; and a fifth step for generating encoded data (which corresponds to the encoded data c shown in FIG. 1 or 6, for example) including the identification information selected in the fourth step.

With the present invention, by instructing a computer to execute such a program encoded and stored in a computer readable storage medium, first, multiple kinds of filter coefficients determined beforehand is held, and identification information uniquely defined for each of the multiple kinds of filter coefficients is held. Next, one filter coefficient is selected in each unit of coding control data from among the multiple kinds of filter coefficients thus held, and the identification information uniquely defined for the filter coefficient thus selected is selected in each unit of coding control data, so as to generate encoded data including the identification information thus selected.

These and other aspects of the invention will become apparent from the following description of the preferred embodiments taken in conjunction with the following drawings.

DETAILED DESCRIPTION OF THE INVENTION

Description will be made below regarding embodiments of the present invention with reference to the drawings. It should be noted that each of the components of the following embodiments can be replaced by a different known component or the like as appropriate. Also, any kind of variation may be made including a combination with other known components. That is to say, the following embodiments described below do not intend to limit the content of the present invention described in the appended claims.

First Embodiment

Configuration of Video Encoding Apparatus AA

Figure 1:
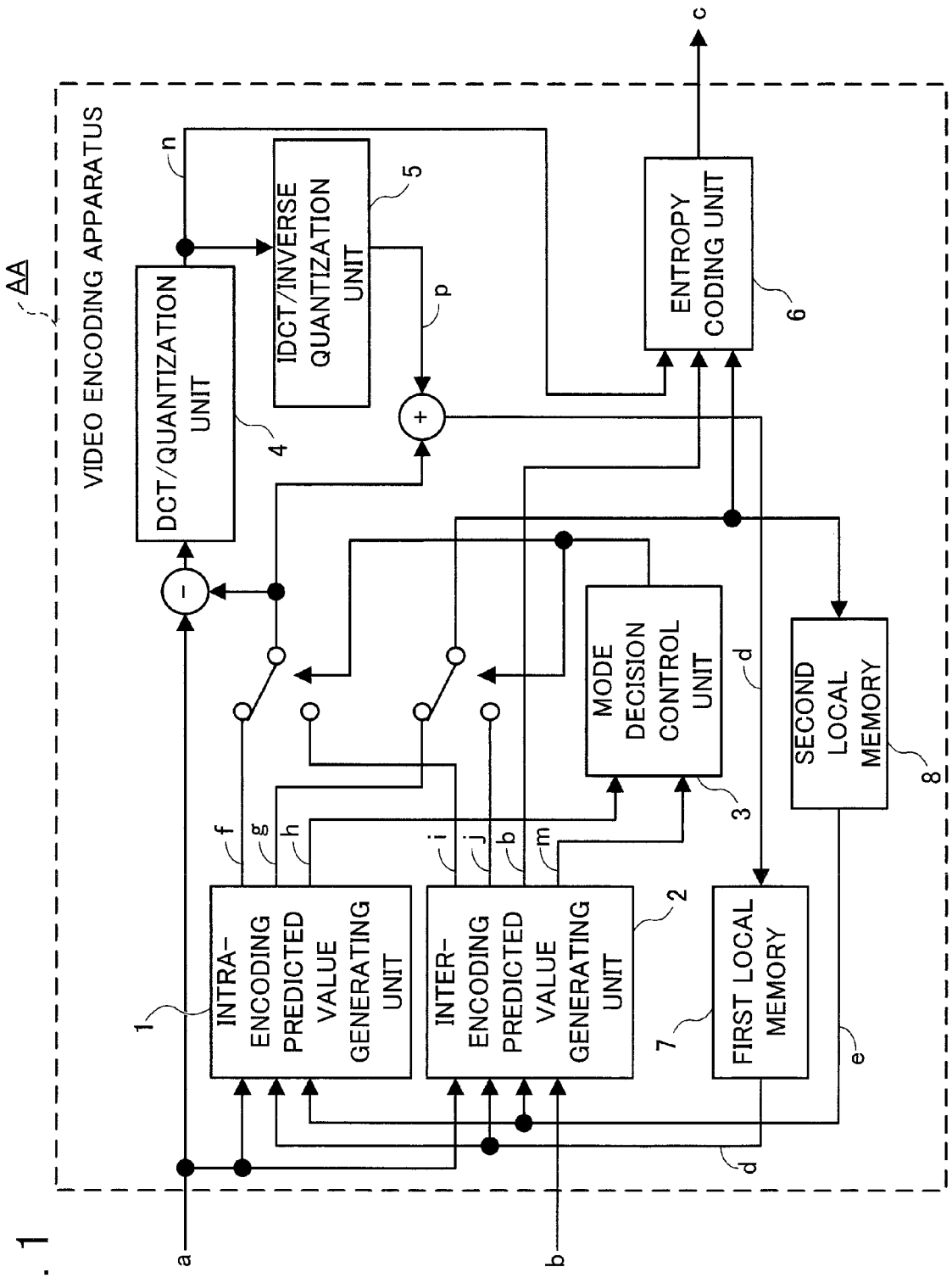
FIG. 1 is a block diagram which shows a configuration of a video encoding apparatus according to a first embodiment of the present invention.

FIG. 1 is a block diagram which shows a configuration of a video encoding apparatus AA according to a first embodiment of the present invention. The video encoding apparatus AA includes an intra coding predicted value generating unit 1, an inter coding predicted value generating unit 2, a mode decision control unit 3, a DCT/quantization unit 4, an IDCT/inverse quantization unit 5, an entropy coding unit 6, first local memory 7, and second local memory 8.

The intra coding predicted value generating unit 1 receives, as input signals, an input video image a, a local decoded value d with respect to an encoded block, and prediction information e with respect to the encoded block. The intra coding predicted value generating unit 1 generates a predicted value based upon the local decoded value d with respect to the encoded block, and calculates the difference between the predicted value thus generated and the input signal so as to calculate the encoding distortion. In the following step, an encoding cost value h required for the encoding is calculated based upon the encoding distortion thus calculated and the prediction information e for the encoded block. Subsequently, the intra coding predicted value generating unit 1 outputs the intra predicted value f, the intra prediction information g, and the encoding cost value h.

The inter coding predicted value generating unit 2 receives, as input signals, the input video image a, the coefficient information b, the local decoded value d with respect to the encoded block, and the prediction information e with respect to the encoded block. The coefficient information b includes multiple kinds of interpolation filter coefficients determined beforehand by a component external to the video encoding apparatus AA. The inter coding predicted value generating unit 2 outputs an inter predicted value i, inter prediction information (including motion vector) j, the coefficient information b, and an encoding cost m, based upon the input data.

Figure 2:
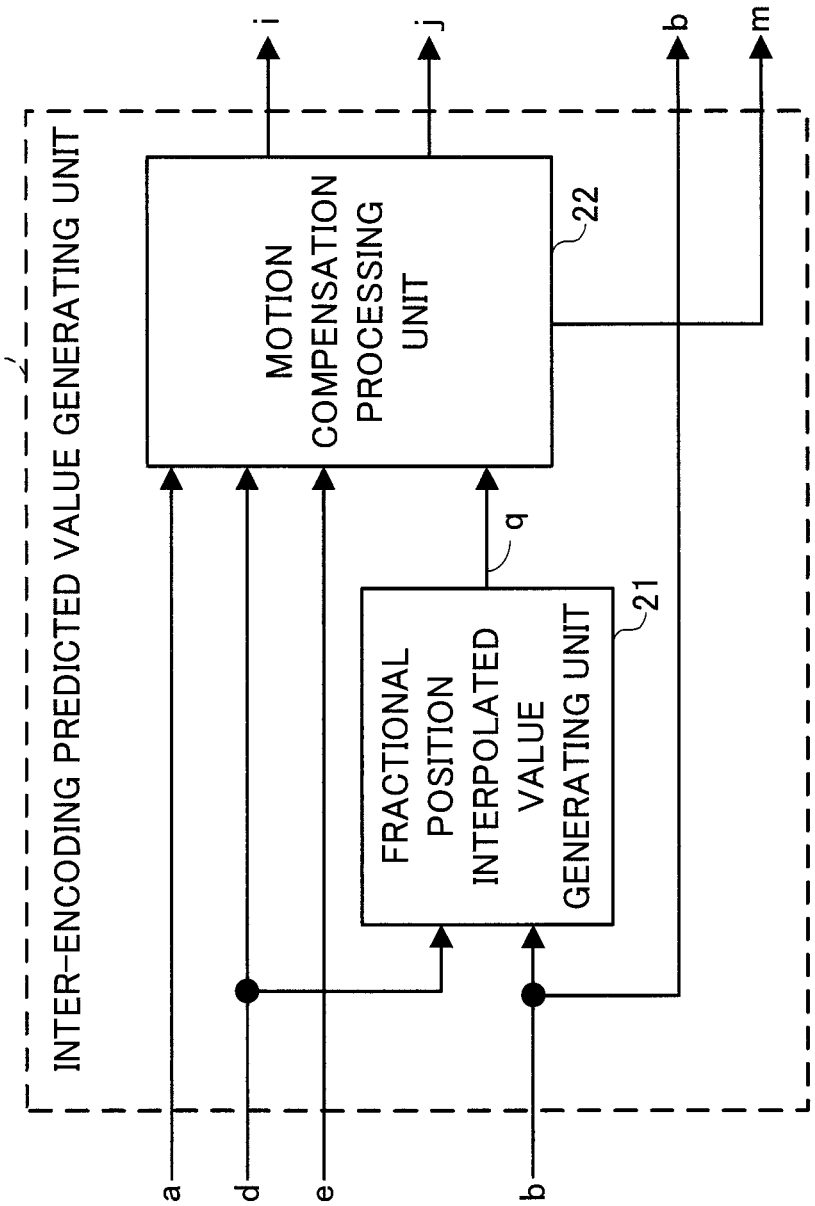
FIG. 2 is a block diagram which shows a configuration of an inter coding predicted value generating unit included in the video encoding apparatus.

FIG. 2 is a block diagram which shows a configuration of an inter coding predicted value generating unit 2. The inter coding predicted value generating unit 2 includes a fractional position interpolated value generating unit 21 and a motion compensation processing unit 22.

The fractional position interpolated value generating unit 21 receives, as input signals, the coefficient information b and the local decoded value d with respect to the encoded block. The fractional position interpolated value generating unit 21 selects a suitable one of the multiple kinds of interpolation filter coefficients, which are included in the coefficient information b in each unit of coding control data, generates an interpolated value at the fractional pixel position with respect to the local decoded value d of the encoded block using the interpolation filter coefficient thus selected, and outputs the resulting value as an interpolated value q at the fractional pixel position with respect to the local decoded value d. It should be noted that description will be made in the present embodiment regarding an arrangement in which fifteen pictures are employed as a unit of coding control data. In the operation for selecting a suitable one of the multiple kinds of interpolation filter coefficients included in the coefficient information b, the R-D optimizing method described in the aforementioned G. J. Sullivan and Thomas Wiegand, "Rate-Distortion Optimization for Video Compression," IEEE Signal Processing Magazine, pp. 74-90, Nov. 1998 may be applied, for example.

The motion compensation processing unit 22 receives, as input signals, an input video image a, a local decoded value d with respect to the encoded block, the prediction information e with respect to the encoded block, and the interpolated value q at the fractional pixel position with respect to the local decoded value d. The motion compensation processing unit 22 performs motion compensation prediction for the encoded block based upon the input video image a, the local decoded value d with respect to the encoded block, and the interpolated value q at the fractional pixel position with respect to the local decoded value d, so as to obtain a motion vector. Furthermore, the motion compensation processing unit 22 calculates the difference between the motion vector thus obtained and the predicted vector calculated based upon the prediction information e for the encoded block, so as to obtain the inter prediction information to be encoded. Furthermore, the motion compensation processing unit 22 calculates the cost value required to perform the inter coding operation, based upon the prediction error and the amount of coding generated. Subsequently, the motion compensation processing unit 22 outputs the information thus obtained as the inter predicted value i, the inter prediction information (including the motion vector) j, and the encoding cost value m.

Returning to FIG. 1, the mode decision control unit 3 receives, as input signals, the encoding cost value h output from the intra coding predicted value generating unit 1 and the encoding cost value m output from the inter coding predicted value generating unit 2. The mode decision control unit 3 makes a comparison between the encoding cost values h and m, and selects an encoding mode suitable for the processing block.

The DCT/quantization unit 4 receives, as an input signal, the difference between the input video image a and a predicted value selected from either the intra predicted value f or the inter predicted value i according to the encoding mode selected by the mode decision control unit 3. That is, with respect to the selection of either the intra predicted value f or the inter predicted value i according to the corresponding encoding mode selected by the mode decision control unit 3, when intra coding is selected by the mode decision control unit 3, the intra predicted value f is selected as the predicted value, and when inter coding is selected by the mode decision control unit 3, the inter predicted value i is selected. The DCT/quantization unit 4 performs DCT processing and quantization processing on the input signal, and outputs the resulting signal in the form of a quantized DCT coefficient (residual signal) n.

The IDCT/inverse quantization unit 5 receives, as an input signal, the quantized DCT coefficient (residual signal) n. The IDCT/inverse quantization unit 5 performs inverse quantization processing and inverse DCT processing on the input signal, and outputs the resulting signal as a pixel signal p subjected to inverse DCT.

The entropy coding unit 6 receives, as input signals, the coefficient information b, the quantized DCT coefficient (residual signal) n, and the prediction information selected from either the intra prediction information g or the inter prediction information j according to the encoding mode selected by the mode decision control unit 3. That is, with respect to the selection of either the intra prediction information g or the inter prediction information j according to the encoding mode selected by the mode decision control unit 3, when intra coding is selected by the mode decision control unit 3, the intra coding information g is selected as the prediction information, and when inter coding is selected by the mode decision control unit 3, the inter prediction information j is selected. The entropy coding unit 6 provides the interpolation filter coefficient information described later for the input signal, performs entropy coding processing on the input signal, and outputs the resulting signal as encoded data c.

The aforementioned interpolation filter coefficient information can be classified into information recorded in a parameter set for the fifteen pictures and information recorded in the control information for each slice. It should be noted that such a parameter set for the fifteen pictures includes a sequence parameter set (SPS) and a picture parameter set (PPS), which are used in the standard method described in Joint Video Team (JVT) of ISO/IEC MPEG and ITU-T VCEG, for example. Moreover, the control information for each slice represents a slice header used in the standard method described in Joint Video Team (JVT) of ISO/IEC MPEG and ITU-T VCEG.

There are three information parameters recorded in a parameter set for the fifteen pictures.

The first information represents whether or not the adaptive interpolation filter method according to the present invention is available. This information is configured as 1-bit flag information. In a case in which the adaptive interpolation filter method according to the present invention is available, the following second information and the following third information are recorded. It should be noted that, if the first information is not provided, it indicates that the adaptive interpolation filter method according to the present invention is not available. In this case, the interpolation filter coefficient described in Joint Video Team (JVT) of ISO/IEC MPEG and ITU-T VCEG or Thomas Wedi is used.

The second information represents the number of interpolation filter coefficients, which are determined beforehand by a component external to the video image encoding apparatus AA. The encoded data c includes the second information in the form of a value obtained by subtracting 1 from the number of interpolation filter coefficients thus determined beforehand by the component external to the video encoding apparatus AA.

The third information comprises information with respect to the multiple kinds of interpolation filter coefficients determined beforehand by the component external to the video encoding apparatus AA and identification information uniquely defined for each of the multiple kinds of interpolation filter coefficients. This information also functions as the information with respect to the interpolation filter coefficient at each fractional pixel position. Each interpolation filter coefficient is quantized, thereby obtaining the encoded interpolation filter coefficient.

Furthermore, the information provided in the form of the control information for each slice includes identification information to be used to identify the interpolation filter coefficient selected for each slice. The identification information is provided in the form of a value in a range from 0 up to a value obtained by subtracting one from the number of interpolation filter coefficients determined beforehand by the component external to the video encoding apparatus AA.

The first local memory 7 receives, as input signals, a signal obtained by summing the predicted value selected from either the intra predicted value f or the inter predicted value i according to the encoding mode selected by the mode decision control unit 3 and the pixel signal p subjected to inverse DCT, i.e., the local decoded value d with respect to the encoded block. The first local memory 7 stores the local decoded value d with respect to the encoded block, and, as appropriate, supplies the local decoded value d thus stored to the intra coding predicted value generating unit 1 and the inter coding predicted value generating unit 2.

The second local memory 8 receives, as an input signal, the prediction information selected from either the intra prediction information g or the inter prediction information j according to the encoding mode selected by the mode decision control unit 3, i.e., the prediction information e with respect to the encoded block. That is, with respect to the selection of either the intra prediction information g or the inter prediction information j according to the corresponding encoding mode selected by the mode decision control unit 3, when intra coding is selected by the mode decision control unit 3, the intra prediction information g is selected as the prediction information, and when inter coding is selected by the mode decision control unit 3, the inter prediction information j is selected. The second local memory 2 stores the prediction information e with respect to the encoded block, and, as appropriate, supplies the prediction information e thus stored to the intra coding predicted generating unit 1 and the inter coding predicted value generating unit 2.

[Operation of Video Encoding Apparatus AA]

Figure 3:
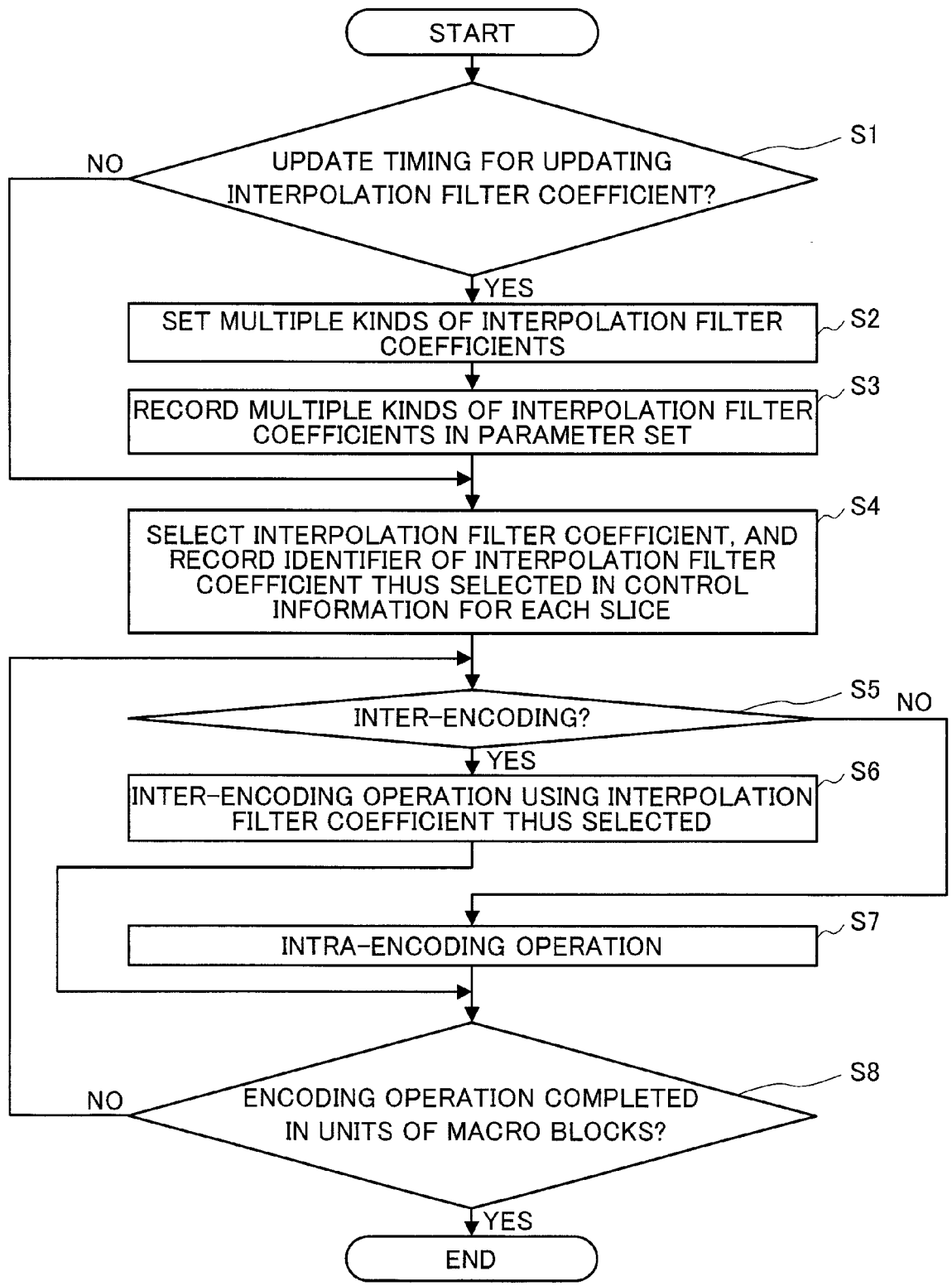
FIG. 3 is a flowchart which shows the operation of the video encoding apparatus.

FIG. 3 is a flowchart which shows the operation of the video encoding apparatus AA.

In Step S1, the video encoding apparatus AA instructs the entropy coding unit 6 to judge whether it is or is not the update timing at which the interpolation filter coefficient used by the fractional position interpolated value generating unit 21 is to be updated. When judgment is made that it is the update timing, i.e., when the encoded data c has been generated for the fifteen pictures, the flow transits to Step 2. On the other hand, when judgment is made that it is not the update timing, i.e., when the encoded data c has not been generated for the fifteen pictures, the flow transits to Step S4.

In Step S2, the video encoding apparatus AA instructs the fractional position interpolated value generating unit 21 to store the multiple kinds of filter coefficients which are included in the coefficient information b, and which has been determined beforehand by a component external to the video encoding apparatus AA. Subsequently, the flow transits to Step S3.

In Step S3, the video encoding apparatus AA instructs the entropy coding unit 6 to record the aforementioned first information, the aforementioned second information, and the aforementioned third information in the parameter set for the fifteen pictures. Subsequently, the flow transits to Step S4.

In Step S4, the video encoding apparatus AA instructs the fractional position interpolated value generating unit 21 to judge whether or not the adaptive interpolation filter method according to the present invention is available based upon the first information recorded in Step S3. When the adaptive interpolation filter method according to the present invention is available, a suitable interpolation filter is selected from among the multiple kinds of interpolation filters stored in Step S2, and when it is not available, an interpolation filter coefficient is selected from among the interpolation filter coefficients described in Joint Video Team (JVT) of ISO/IEC MPEG and ITU-T VCEG, "Text of ISO/IEC 14496-10 Advanced Video Coding or Thomas Wedi. Furthermore, the video encoding apparatus AA instructs the entropy coding unit 6 to record the identification information with respect to the interpolation filter coefficient thus selected in the control information for each slice such as a slice header. Subsequently, the flow transits to Step S5.

In Step S5, the video encoding apparatus AA instructs the mode decision control unit 3 to judge whether or not the encoding mode suitable for the processing block is the inter coding mode. When judgment is made that the inter coding mode is suitable, the flow transits to Step S6. When judgment is made that the inter coding mode is not suitable, the flow transits to Step S7.

In Step S6, the video encoding apparatus AA instructs the inter coding predicted value generating unit 2 to perform an inter coding operation using the interpolation filter coefficient selected in Step S4, and outputs the result to the entropy coding unit 6. Subsequently, the flow transits to Step S8.

In Step S7, the video encoding apparatus AA instructs the intra coding predicted value generating unit 1 to perform an intra coding operation, and outputs the result to the entropy coding unit 6. Subsequently, the flow transits to Step S8.

In Step S8, the video encoding apparatus AA judges whether or not encoding has been completed, in units of macroblocks. When judgment is made that the encoding has been completed, the operation shown in FIG. 3 ends. When judgment is made that the encoding has not been completed, the flow transits to Step S5.

[Configuration of Video Decoding Apparatus BB]

Figure 4:
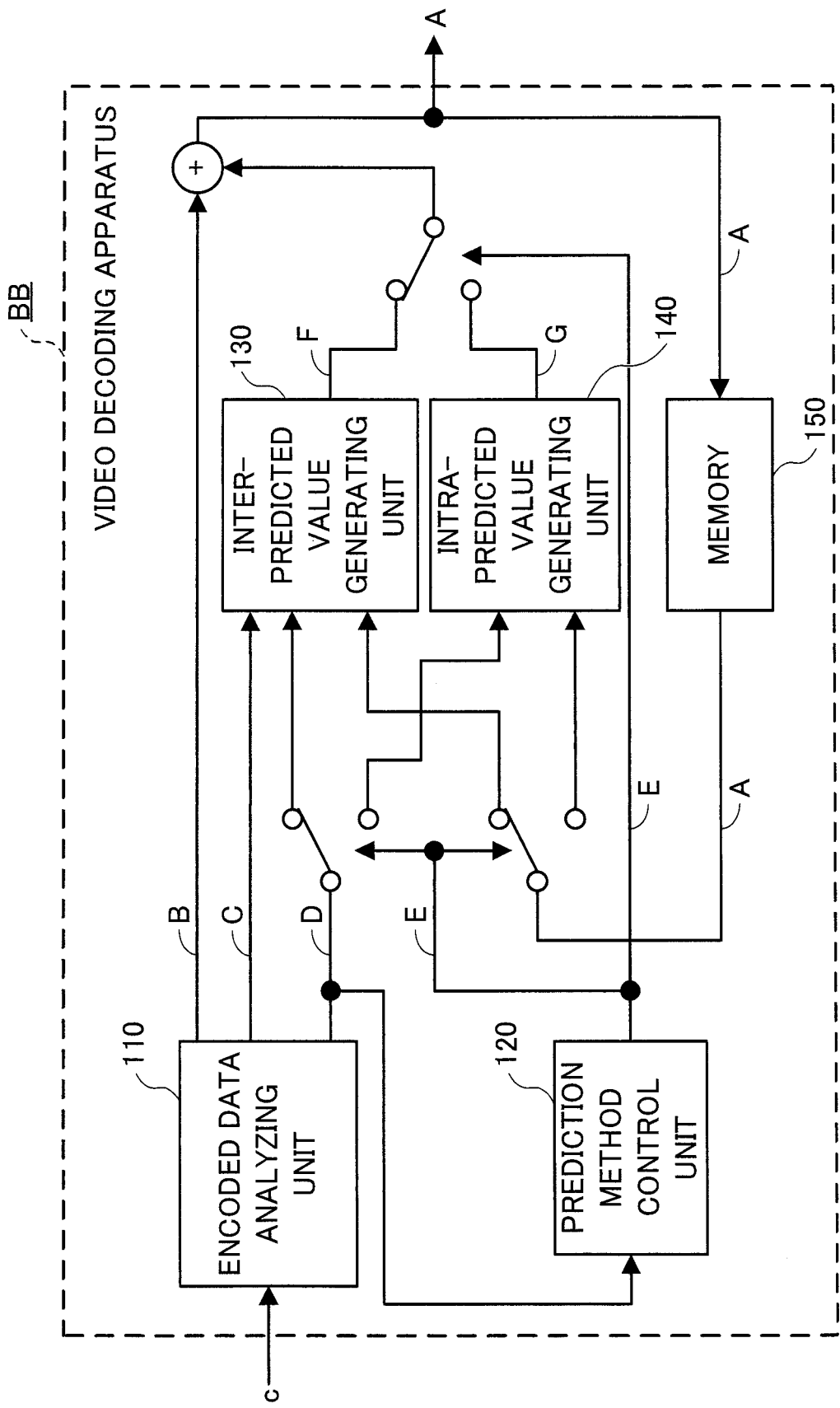
FIG. 4 is a block diagram which shows a configuration of a video decoding apparatus according to a first embodiment of the present invention.

FIG. 4 is a block diagram which shows a configuration of a video decoding apparatus BB according to the first embodiment of the present invention. The video decoding apparatus BB includes an encoded data analyzing unit 110, a prediction method control unit 120, an inter predicted value generating unit 130, an intra predicted value generating unit 140, and memory 150, and is configured to decode the encoded data c generated by the video encoding apparatus AA.

The encoding data analyzing unit 110 receives the encoded data c as an input signal. First, the encoded data analyzing unit 110 analyzes the content recorded in the encoded data c according to the coding syntax, and entropy decodes the encoded data c. Next, the encoding data analyzing unit 110 analyzes the information recorded in the parameter set for the fifteen pictures, based upon the aforementioned interpolation filter coefficient included in the encoded data c. Specifically, the encoding data analyzing unit 110 judges whether or not the adaptive interpolation filter method according to the present invention is available based upon the aforementioned first information. When judgment is made that the adaptive interpolation filter method according to the present invention is available, first, the encoding data analyzing unit 110 reads out the aforementioned second information and third information, analyzes the information to be used to identify the interpolation filter coefficient selected for each slice, and reads out the identification information with respect to the interpolation filter coefficient that was applied in the video encoding apparatus AA so as to encode a frame that corresponds to the slice for which the information is analyzed. Next, the encoding data analyzing unit 110 selects an interpolation filter coefficient that corresponds to the identification information thus read out, from among the aforementioned multiple kinds of interpolation filter coefficients determined beforehand, based upon the second information and the third information. Subsequently, the encoding data analyzing unit 110 outputs an entropy decoded residual signal B obtained as a result of the entropy decoding, and entropy decoded prediction information D. At the same time, the encoding data analyzing unit 110 outputs the aforementioned interpolation filter coefficient thus selected as the interpolation filter coefficient C.

The prediction method control unit 120 receives, as an input signal, the entropy decoded prediction information D. The prediction method control unit 120 judges whether or not the entropy decoded prediction information D corresponds to the intra prediction or the inter prediction, and outputs a control signal E which is used to switch the mode between intra prediction and the inter prediction.

The inter predicted value generating unit 130 receives the interpolation filter coefficient C as an input signal. Furthermore, in some cases, the inter predicted value generating unit 130 receives, as input signals, the decoded pixel value A and the entropy decoded prediction information D according to the control signal E. Specifically, when the prediction method control unit 120 identifies the entropy decoded prediction information D as being related to inter prediction, the decoded pixel value A and the entropy decoded prediction information D are input to the inter predicted value generating unit 130. The inter predicted value generating unit 130 generates an inter predicted value F based upon the decoded pixel value A according to the entropy decoded prediction information D, and outputs the inter predicted value F thus generated.

Figure 5:
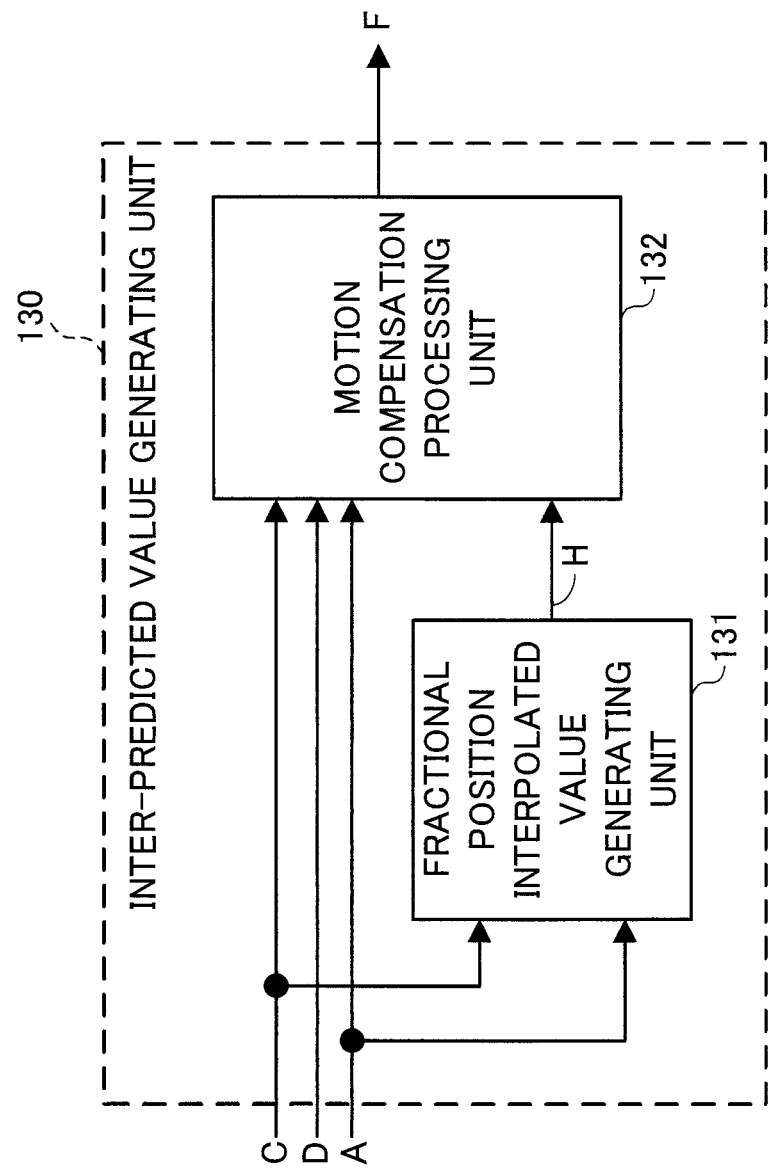
FIG. 5 is a block diagram which shows a configuration of an inter coding predicted value generating unit included in the video decoding apparatus.

FIG. 5 is a block diagram which shows a configuration of an inter predicted value generating unit 130. The inter predicted value generating unit 130 includes a fractional position interpolated value generating unit 131 and a motion compensation processing unit 132.

The fractional position interpolated value generating unit 131 receives, as input signals, the decoded pixel value A and the interpolation filter coefficient C. Subsequently, the fractional position interpolated value generating unit 131 generates an interpolated value H at the fractional pixel position with respect to the decoded pixel value A according to the interpolation filter coefficient C, and outputs the interpolated value H thus generated.

The motion compensation processing unit 132 receives, as input signals, the decoded pixel value A, the interpolation filter coefficient C, the entropy decoded prediction information D, and the interpolated value H at the fractional pixel position with respect to the decoded pixel value A. The motion compensation processing unit 132 generates an inter predicted value F with reference to the decoded pixel value A based upon the motion vector generated based upon the entropy decoded prediction information D.

Returning to FIG. 4, in some cases, the intra predicted value generating unit 140 receives, as input signals, the decoded pixel value A and the entropy decoded prediction information D according to the control signal E. Specifically, when the prediction method control unit 120 identifies the entropy decoded prediction information D as being related to intra prediction, the decoded pixel value A and the entropy decoded prediction information D are input to the intra predicted value generating unit 140. The intra predicted value generating unit 140 generates an intra predicted value G based upon the decoded pixel value A according to the entropy decoded prediction information D, and outputs the intra predicted value G thus generated.

The memory 150 receives a signal obtained by summing the entropy decoded residual signal B and a predicted value that has been selected, from either the inter predicted value F or the intra predicted value G, as being related to the control signal E, i.e., receives the decoded pixel value A as an input signal. That is, with respect to the selection of either the inter predicted value F or the intra predicted value G according to the control signal E, when the prediction method control unit 120 identifies the entropy decoded prediction information D as being related to inter prediction, the inter predicted value F is selected, and when the prediction method control unit 120 identifies the entropy decoded prediction information D as being related to intra prediction, the intra predicted value G is selected. The memory 150 stores the decoded pixel value A thus input, and, as appropriate, supplies the decoded pixel value A to the inter predicted value generating unit 130 or the intra predicted value generating unit 140.

With the above-described video encoding apparatus AA, one suitable interpolation filter coefficient is selected from among multiple kinds of interpolation filter coefficients determined beforehand by a component external to the video encoding apparatus AA. Next, in the operation for generating the encoded data c, the identification information uniquely defined for the selected interpolation filter coefficient is recorded in the control information for each slice, and the encoded data c, which includes the identification information uniquely defined for the interpolation filter coefficient, is generated using the interpolation filter coefficient thus selected. Accordingly, such an arrangement provides a reduced amount of information included in the encoded data c as compared with an arrangement in which encoded data c including the interpolation filter coefficient is generated. Accordingly, such an arrangement provides a reduction in the amount of information included in the encoded data c, as compared with an arrangement configured to generate the encoded data c including the interpolation filter coefficient. Thus, such an arrangement allows the amount of coding required for the encoded data c to be reduced while it uses such an adaptive interpolation filter coefficient. It should be noted that, with an arrangement configured to encode a WVGA-resolution video image in which the GOP (GOP: Groups of Pictures) length is set to 15, and where four kinds of interpolation filter coefficients are determined beforehand by a component external to the video encoding apparatus AA, such an arrangement provides a reduction in the amount of coding on the order of 7% as compared with an arrangement configured to perform H.264 conversion.

Furthermore, the video encoding apparatus AA is capable of generating the encoded data c using the multiple kinds of interpolation filter coefficients determined beforehand by a component external to the video encoding apparatus AA.

The above-described video decoding apparatus BB acquires the multiple kinds of interpolation filter coefficients that had been candidates when the video encoding apparatus AA selected a suitable interpolation filter coefficient, acquires the identification information uniquely defined for the respective multiple kinds of interpolation filter coefficients, and acquires the identification information uniquely defined for the interpolation filter coefficient that was selected as being the suitable coefficient by the video encoding apparatus AA, based upon the encoded data c generated by the video encoding apparatus AA. Subsequently, the video decoding apparatus BB identifies the interpolation filter coefficient that was selected as being the suitable interpolation filter coefficient by the video encoding apparatus AA, i.e., the interpolation filter coefficient that was used by the video encoding apparatus AA. The video decoding apparatus BB generates the decoded pixel value A using the interpolation filter coefficient thus identified. Thus, the video decoding apparatus BB is capable of generating the decoded pixel value A using the interpolation filter coefficients that were used for each set of fifteen pictures by the video encoding apparatus AA.

Second Embodiment

Figure 6:
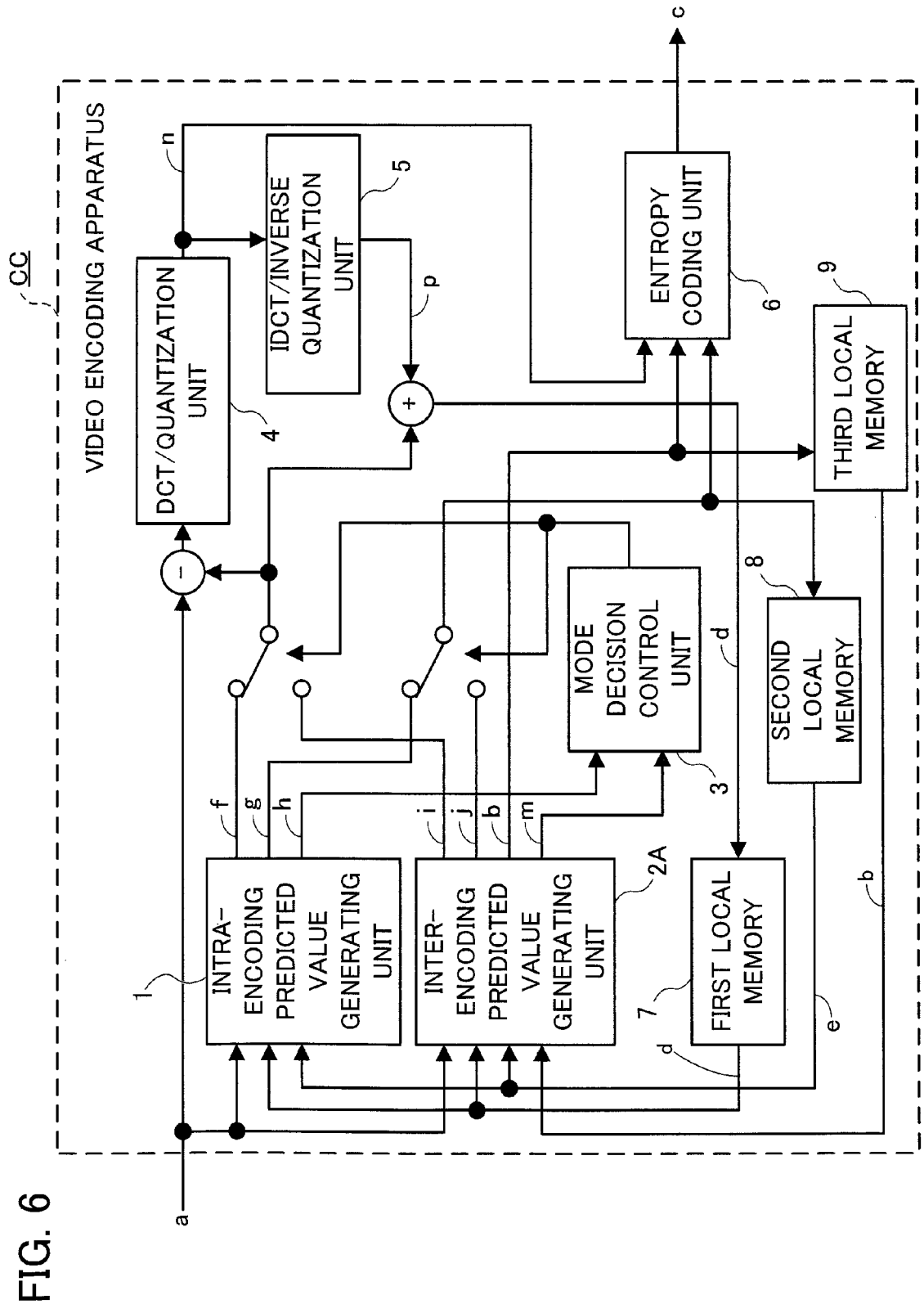
FIG. 6 is a block diagram which shows a configuration of a video encoding apparatus according to a second embodiment of the present invention.

FIG. 6 is a block diagram which shows a configuration of a video encoding apparatus CC according to a second embodiment of the present invention. The difference between the video encoding apparatus CC according to the second embodiment of the present invention and the video encoding apparatus AA according to the first embodiment shown in FIG. 1 is that the video encoding apparatus CC includes third local memory 9, includes an inter coding predicted value generating unit 2A instead of the inter coding predicted value generating unit 2, and uses a different setting method for setting the multiple kinds of interpolation filter coefficients which each function as a candidate when a suitable interpolation filter coefficient is selected. Specifically, with the video encoding apparatus AA, the multiple kinds of interpolation filter coefficients are determined beforehand by a component external to the video encoding apparatus AA. In contrast, with the video encoding apparatus CC, the multiple kinds of interpolation filter coefficients are determined by an internal component of the video encoding apparatus CC. It should be noted that the same components of the video encoding apparatus CC as those in the video encoding apparatus AA are denoted by the same reference numerals, and description thereof will be omitted.

The third local memory 9 receives the coefficient information b as an input signal. The coefficient information b includes the interpolation filter coefficient for the encoded frame. The third local memory 9 stores the interpolation filter coefficient selected for each slice in units of encoded picture groups (GOP), and supplies, to the inter coding predicted value generating unit 2A, the coefficient information b including the interpolation filter coefficient thus stored for the immediately previous GOP.

The inter coding predicted value generating unit 2A receives, as input signals, the input video image a, the coefficient information b including the interpolation filter coefficient for the immediately previous GOP, the local decoded value d with respect to the encoded block, and the prediction information e with respect to the encoded block. The inter coding predicted value generating unit 2A outputs the inter predicted value i, the inter predicted information (including the motion vector) j, the coefficient information b, and the encoding cost value m, based upon the input signals thus received.

Figure 7:
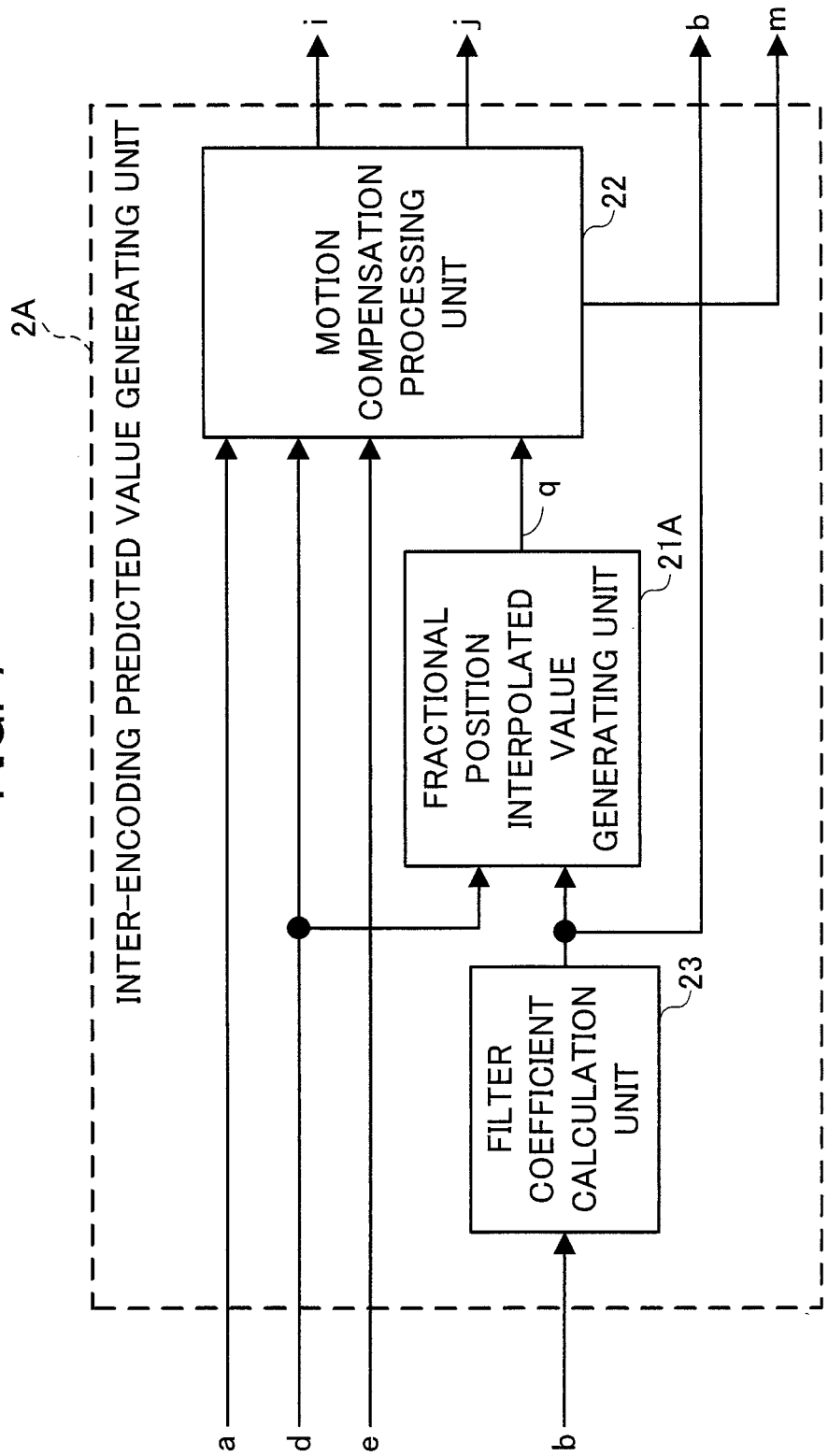
FIG. 7 is a block diagram which shows a configuration of an inter coding predicted value generating unit included in the video encoding apparatus.

FIG. 7 is a block diagram which shows a configuration of the inter coding predicted value generating unit 2A. The inter coding predicted value generating unit 2A includes a fractional position interpolated value generating unit 21A, a motion compensation processing unit 22, and a filter coefficient calculation unit 23.

The filter coefficient calculation unit 23 receives, as an input signal, the coefficient information b including the interpolation filter coefficient for the immediately previous GOP. First, the filter coefficient calculation unit 23 obtains the average characteristics of the interpolation filter coefficients that were applied to the immediately previous GOP, and acquires the interpolation filter coefficient that matches the characteristics thus obtained. Next, with the interpolation filter coefficient thus acquired as a reference interpolation filter coefficient, the filter coefficient calculation unit 23 obtains at least one of either an interpolation filter coefficient having a wider pass band than that of the reference interpolation filter coefficient, or an interpolation filter coefficient having a narrower pass band than that of the reference interpolation filter coefficient. Subsequently, the filter coefficient calculation unit 23 sets, as the aforementioned multiple kinds of interpolation filter coefficients, the aforementioned reference interpolation filter coefficient and the interpolation filter coefficient thus obtained based upon the reference interpolation filter coefficient. Subsequently, the filter coefficient calculation unit 23 outputs the coefficient information b including the multiple kinds of interpolation filter coefficients thus set.

The fractional position interpolation interpolated value generating unit 21A receives, as input signals, the coefficient information b including the multiple kinds of interpolation filter coefficients and the local decoded value d with respect to the encoded block. The fractional position interpolated value generating unit 21A selects, in each unit of coding control data, a suitable one of the multiple kinds of interpolation filter coefficients included in the coefficient information b, generates an interpolated value at the fractional pixel position with respect to the local decoded value d with respect to the encoded block using the interpolation filter coefficient thus selected, and outputs the interpolated value thus generated as an interpolated value q at the fractional pixel position with respect to the local decoded value d. It should be noted that, with the present embodiment, fifteen pictures are taken to be used as a unit of coding control data. In the operation for selecting a suitable one of the multiple kinds of interpolation filter coefficients included in the coefficient information b, the R-D optimizing method described in the aforementioned Non-patent document may be applied, for example.

It should be noted that, with the present embodiment, the encoded data c output from the video encoding apparatus CC is taken to be received by a video decoding apparatus configured to receive, from the video encoding apparatus CC, the multiple kinds of interpolation filter coefficients which each function as a candidate when a particular interpolation filter coefficient is selected, in the same way as with the video decoding apparatus BB shown in FIG. 4 according to the first embodiment of the present invention.

With the aforementioned video encoding apparatus CC, the multiple kinds of interpolation filter coefficients are set by an internal component of the video encoding apparatus CC, and the encoded data c can be generated using the multiple kinds of interpolation filter coefficients thus set.

It should be noted that the operation of the video encoding apparatus AA or CC, or the operation of the image decoding apparatus BB may be stored in a computer-readable storage medium. Also, the video encoding apparatus AA or CC, or the video decoding apparatus BB may read out a program stored in a storage medium, and may execute the program thus read out. Such an arrangement also provides the present invention.

Also, the aforementioned program may be transmitted from the video encoding apparatus AA or CC, or the video decoding apparatus BB, which stores the program in a storage device, to another computer system via a transmission medium or transmission wave in a transmission medium. The term "transmission medium" as used here represents a medium having a function of transmitting information, examples of which include a network (communication network) such as the Internet, etc., a communication link (communication line) such as a phone line etc.

Also, the aforementioned program may be configured to provide a part of the aforementioned functions. Also, the aforementioned program may be configured to provide the aforementioned functions in combination with a different program already stored in the video encoding apparatus AA or CC, or the video decoding apparatus BB. That is to say, the aforementioned program may be configured as a differential file (differential program).

Detailed description has been made regarding the embodiments of the present invention with reference to the drawings. However, the specific configuration thereof is not restricted to the above-described embodiments. Rather, any modifications may be made without departing from the spirit of the present invention.

For example, description has been made in the embodiments regarding an arrangement in which fifteen pictures are used as a unit of coding control data. However, the present invention is not restricted to such an arrangement. Also, one or more macroblocks, one or more slices, one or more pictures, or one or more frames may be used as such a unit of coding control data.

Description has been made in the aforementioned second embodiment regarding an arrangement in which the encoded data c output from the video encoding apparatus CC is received by a video decoding apparatus configured to receive, from the video encoding apparatus CC, the multiple kinds of interpolation filter coefficients which each function as a candidate when a particular interpolation filter coefficient is selected, in the same way as with the video decoding apparatus BB shown in FIG. 4 according to the first embodiment of the present invention. For example, an arrangement may be made in which the encoded data c is received by a video decoding apparatus configured to set the aforementioned multiple kinds of interpolation filter coefficients by means of an internal component thereof, in the same way as with the filter coefficient calculation unit 23 shown in FIG. 7.

Description has been made in the aforementioned embodiments regarding an arrangement in which the present invention is applied to a filtering operation in the motion compensation prediction. However, the present invention is not restricted to such an arrangement. Also, the present invention can be applied to other processing similar to motion compensation prediction such as inter-layer prediction in a scalable encoding operation, disparity-compensation prediction in a multi-view video encoding operation, and so on.

It should be noted that the present invention can be applied to various kinds of video images. In particular, the present invention can be suitably applied to a low bit rate encoding operation corresponding to a low resolution.

While preferred embodiments of the invention have been described and illustrated above, it should be noted that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

DESCRIPTION OF THE REFERENCE NUMERALS

AA, CC video encoding apparatus
BB video decoding apparatus 1 intra coding predicted value generating unit
2, 2A inter coding predicted value generating unit
3 mode decision control unit
4 DCT/quantization unit
5 IDCT/inverse quantization unit
6 entropy coding unit
7 first local memory
8 second local memory
9 third local memory
21, 21A fractional position interpolated value generating unit
22 motion compensation processing unit
23 filter coefficient calculation unit
110 encoded data analyzing unit
120 prediction method control unit
130 inter predicted value generating unit
140 intra predicted value generating unit
150 memory
131 fractional position interpolated value generating unit
132 motion compensation processing unit.

What is claimed is:

1. A video encoding apparatus configured to allow filtering processing to be performed for a predicted value in an inter-frame prediction, the video encoding apparatus comprising:
   an encoding filter coefficient holding unit configured to hold multiple kinds of filter coefficients determined beforehand;
   an encoding identification information holding unit configured to hold identification information uniquely defined for each of the multiple kinds of filter coefficients;
   an encoding filter coefficient selecting unit configured to select, in each unit of coding control data, one from among the multiple kinds of filter coefficients held by the encoding filter coefficient holding unit;
   an identification information selecting unit configured to select, in each unit of coding control data, identification information uniquely defined for the filter coefficient selected by the encoding filter coefficient selecting unit, from among the multiple kinds of identification information held by the encoding identification information holding unit;
   an encoded data generating unit configured to generate encoded data including the identification information selected by the identification information selecting unit, and
   a filter coefficient decision unit configured to decide the multiple kinds of filter coefficients,
   wherein the encoding filter coefficient holding unit is configured to hold the filter coefficients decided by the filter coefficient decision unit,
   and wherein the filter coefficient decision unit includes:
     an encoding filter coefficient storage unit configured to store the filter coefficients selected by the encoding filter coefficient selecting unit in each unit of coding control data;
     an encoding reference filter coefficient setting unit configured to set one filter coefficient based upon the filter coefficients stored in the encoding filter coefficient storage unit; and
     an encoding filter coefficient setting unit configured to use the filter coefficient set by the encoding reference filter coefficient setting unit as a reference filter coefficient, and to set at least one from among a filter coefficient having a wider pass band than that of the reference filter coefficient and a filter coefficient having a narrower pass band than that of the reference filter coefficient,
   and wherein the filter coefficient set by the encoding reference filter coefficient setting unit and the filter coefficient set by the encoding filter coefficient setting unit are decided so as to be the multiple kinds of filter coefficients.

2. A video encoding apparatus according to claim 1, further comprising an input unit configured to receive, as an input signal, multiple kinds of filter coefficients determined beforehand,
   wherein the encoding filter coefficient holding unit is configured to hold the filter coefficients thus received via the input unit as an input signal.

3. A video encoding apparatus according to claim 1, wherein the unit of coding control data is configured as any one of one or more macroblocks, one or more slices, one or more pictures, and one or more frames.

4. A video decoding apparatus configured to decode encoded data generated by a video encoding apparatus according to claim 1, the video decoding apparatus comprising:
   an encoded data decoding unit configured to decode the encoded data so as to obtain decoded data;
   a decoding filter coefficient holding unit configured to hold the multiple kinds of filter coefficients held by the encoding filter coefficient holding unit;
   a decoding identification information holding unit configured to hold the identification information held by the encoding identification information holding unit;
   a decoding filter coefficient selecting unit configured to select a filter coefficient that corresponds to the identification information included in the encoded data, from among the multiple kinds of filter coefficients held by the decoding filter coefficient holding unit, based upon the identification information held by the decoding identification information holding unit; and
   a predicted image generating unit configured to generate a motion compensation predicted image using the filter coefficient selected by the decoding filter coefficient selecting unit.

5. A video decoding apparatus according to claim 4, comprising an identification information acquisition unit configured to acquire identification information from the decoded data,
   wherein the decoding filter coefficient selecting unit selects a filter coefficient that corresponds to the identification information acquired by the identification information acquisition unit, as the filter coefficient that corresponds to the identification information included in the encoded data.

6. A video decoding apparatus configured to decode encoded data generated by a video encoding apparatus according to claim 1, the video decoding apparatus comprising
   an encoded data decoding unit configured to decode the encoded data so as to obtain decoded data;
   a decoding filter coefficient holding unit configured to hold multiple kinds of filter coefficients;
   a decoding identification information holding unit configured to hold the identification information held by the encoding identification information holding unit;
   an identification information acquisition unit configured to acquire the identification information from the decoded data;

a decoding filter coefficient selecting unit configured to select a filter coefficient that corresponds to the identification information acquired by the identification information acquisition unit, from among the multiple kinds of filter coefficients held by the decoding filter coefficient holding unit, based upon the identification information held by the decoding identification information holding unit;

a predicted image generating unit configured to generate a motion compensation predicted image, using the filter coefficient selected by the decoding filter coefficient selecting unit;

a decoding filter coefficient storage unit configured to store the filter coefficients that were used by the predicted image generating unit;

a decoding reference filter coefficient setting unit configured to set one filter coefficient based upon the filter coefficients stored in the decoding filter coefficient storage unit; and a decoding filter coefficient setting unit configured to use the filter coefficient set by the decoding reference filter coefficient setting unit as a reference filter coefficient, and to set at least one filter coefficient selected from among a filter coefficient having a wider pass band than that of the reference filter coefficient and a filter coefficient having a narrower pass band than that of the reference filter coefficient, wherein the decoding filter coefficient holding unit is configured to hold, as the aforementioned multiple kinds of filter coefficients, the filter coefficient set by the decoding reference filter coefficient setting unit and the filter coefficient set by the decoding filter coefficient setting unit.

7. A video decoding apparatus according to claim 4, wherein the unit of coding control data is configured as any one of one or more macroblocks, one or more slices, one or more pictures, and one or more frames.

8. A video encoding apparatus according to claim 1, wherein the encoded data generating unit is configured to generate encoded data according to a coding data structure including identification information to be applied in each unit of coding control data, as a setting value set for each unit of coding control data.

9. A video encoding apparatus according to claim 8, comprising, as setting values to be set for multiple units of coding control data, filter coefficients held by the encoding filter coefficient holding unit and the number of filter coefficients.

10. A video decoding apparatus according to claim 4, wherein the encoded data decoding unit is configured to decode encoded data according to a coding data structure including identification information to be applied in each unit of coding control data, as a setting value set for each unit of coding control data.

11. A video decoding apparatus according to claim 10, comprising, as setting values to be set for multiple units of coding control data, filter coefficients held by the encoding filter coefficient holding unit and the number of filter coefficients.

12. A video encoding method for allowing filtering processing to be performed for a predicted value in an inter-frame prediction, the video encoding method comprising:

a first step for holding multiple kinds of filter coefficients determined beforehand;

a second step for holding identification information uniquely defined for each of the multiple kinds of filter coefficients;

a third step for selecting, in each unit of coding control data, one from among the multiple kinds of filter coefficients held in the first step;

a fourth step for selecting, in each unit of coding control data, the identification information uniquely defined for the filter coefficient selected in the third step, from among the multiple kinds of identification information held in the second step; and a fifth step for generating encoded data including the identification information selected in the fourth step, and a sixth step for deciding the multiple kinds of filter coefficients, wherein the first step includes holding the filter coefficients decided in the sixth step, and wherein the sixth step includes:

a seventh step for storing the filter coefficients selected in the third step in each unit of coding control data;

an eighth step for setting one filter coefficient based upon the filter coefficients stored in the seventh step; and a ninth step for using the filter coefficient set in the eighth step as a reference filter coefficient, and for setting at least one from among a filter coefficient having a wider pass band than that of the reference filter coefficient and a filter coefficient having a narrower pass band than that of the reference filter coefficient, and wherein the filter coefficient set in the eighth step and the filter coefficient set in the ninth step are decided so as to be the multiple kinds of filter coefficients.

13. A video decoding method for decoding encoded data generated using a video encoding method according to claim 12, the video decoding method further including:

a tenth step for decoding the encoded data so as to obtain decoded data;

an eleventh step for holding the multiple kinds of filter coefficients held in the first step;

a twelfth step for holding the identification information held in the second step;

a thirteenth step for selecting a filter coefficient that corresponds to the identification information included in the encoded data, from among the multiple kinds of filter coefficients held in the eleventh step, based upon the identification information held in the twelfth step; and a fourteenth step for generating a motion compensation predicted image using the filter coefficient selected in the thirteenth step.

14. Apparatus comprising a non-transitory computer readable storage medium having a computer program encoded thereon and stored in a computer readable format, the computer program being executable by a computer to cause the computer to execute a video encoding method for allowing filtering processing to be performed for a predicted value in an inter-frame prediction, the video encoding method comprising steps of:

a first step for holding multiple kinds of filter coefficients determined beforehand;

a second step for holding identification information uniquely defined for each of the multiple kinds of filter coefficients;

a third step for selecting, in each unit of coding control data, one from among the multiple kinds of filter coefficients held in the first step;

a fourth step for selecting, in each unit of coding control data, the identification information uniquely defined for the filter coefficient selected in the third step, from among the multiple kinds of identification information held in the second step; and a fifth step for generating encoded data including the identification information selected in the fourth step, and a sixth step for deciding the multiple kinds of filter coefficients, wherein the first step includes holding the filter coefficients decided in the sixth step, and wherein the sixth step includes:

a seventh step for storing the filter coefficients selected in the third step in each unit of coding control data;

an eighth step for setting one filter coefficient based upon the filter coefficients stored in the seventh step; and a ninth step for using the filter coefficient set in the eighth step as a reference filter coefficient, and for setting at least one from among a filter coefficient having a wider pass band than that of the reference filter coefficient and a filter coefficient having a narrower pass band than that of the reference filter coefficient, and wherein the filter coefficient set in the eighth step and the filter coefficient set in the ninth step are decided so as to be the multiple kinds of filter coefficients.

15. Apparatus according to claim 14, wherein the video decoding method further includes steps of:

a tenth step for decoding the encoded data so as to obtain decoded data;

an eleventh step for holding the multiple kinds of filter coefficients held in the first step;

a twelfth step for holding the identification information held in the second step;

a thirteenth step for selecting a filter coefficient that corresponds to the identification information included in the encoded data, from among the multiple kinds of filter coefficients held in the eleventh step, based upon the identification information held in the twelfth step; and fourteenth step for generating a motion compensation predicted image using the filter coefficient selected in the thirteenth step.

* * * * *